United States Patent [19]

Wing et al.

[11] Patent Number: 4,862,486

[45] Date of Patent: Aug. 29, 1989

[54] REVOLUTION COUNTER ATTACHED TO TIRES

[76] Inventors: J. Keith Wing, Rte. 1, Merry Oak Ter., Piedmont, S.C. 29673; E. Lamar Sheppard, 232 Kings Way, Clemson, S.C. 29631; William L. Willis, P.O. Box 349, Clemson, S.C. 29633

[21] Appl. No.: 121,401

[22] Filed: Nov. 16, 1987

[51] Int. Cl.⁴ .................. B60C 23/06; G01C 22/00
[52] U.S. Cl. .................................... 377/16; 377/24.1; 377/19; 340/665; 340/425.5; 200/61.57; 200/61.23
[58] Field of Search .............. 377/6, 9, 24.1, 24.2, 377/16, 19; 340/665, 58; 307/105 B; 200/61.13, 61.14, 61.23, 61.57; 235/95 B

[56] References Cited

U.S. PATENT DOCUMENTS

| | | | |
|---|---|---|---|
| 3,581,277 | 5/1971 | Beatty et al. | 340/58 |
| 4,117,452 | 9/1978 | Snyder et al. | 200/61.23 |
| 4,156,190 | 5/1979 | Chittenden et al. | 377/24.2 |
| 4,210,898 | 7/1980 | Betts | 340/58 |
| 4,246,567 | 1/1981 | Miller | 200/61.23 |
| 4,680,454 | 7/1987 | Zeaman et al. | 377/24.2 |
| 4,697,278 | 9/1987 | Fleischer | 235/95 B |

Primary Examiner—John S. Heyman
Attorney, Agent, or Firm—Bailey & Hardaway

[57] ABSTRACT

A method and apparatus for the determination of automobile and truck tire revolutions wherein said apparatus adhered to the tire detects each revolution by the flexing of that section of the tire.

6 Claims, 1 Drawing Sheet

REVOLUTION COUNTER ATTACHED TO TIRES

BACKGROUND OF THE INVENTION

This invention relates generally to the art of counting and more particularly to an apparatus for counting automotive and truck tire revolutions.

The automotive industry uses axle revolution counters to keep track of the miles that tires run. In the past, a hubodometer, a mechanical apparatus attached to an axle, has been used to count tire revolutions. A problem with such a mechanical counter is that, being mounted on the axle rather than the tire itself, the mechanical counter must be changed or separate records must be kept whenever the tire is changed to maintain a proper count for each tire. Therefore, data can easily be lost or confused.

A second method of counting requires an external trigger or pick-up on the vehicle which means every possible position the tire can be in must be fitted with the external trigger or pick-up which is a very expensive and generally unsatisfactory solution.

SUMMARY OF THE INVENTION

It is thus an object of this invention to provide an improved process and apparatus for determining automotive and truck tire revolutions.

It is a further object of this invention to provide an apparatus for the determination of automobile and truck tire revolutions which is mounted solely to the tire.

It is a further and yet more particular object of this invention to provide an apparatus for the determination of automobile and truck tire revolutions which is mounted solely to the tire and is completely self-contained requiring no external trigger or pick-up.

These as well as other objects are accomplished by an apparatus wherein stress from each revolution of a tire is detected in a section of the tire as it is stressed when that section of the tire comes into contact with the road.

DETAILED DESCRIPTON

In accordance with this invention it has been found that a tire revolution for passenger, light truck, truck and off-the-road vehicles can be determined and counted by an apparatus comprising a piezoelectric polymer sensor which senses a change in stress as a given section of the tire is stressed with each revolution.

Piezoelectric polymers are comprised of aligned dipoles that squeeze together when stress is applied to the polymer. The squeezing causes a mutual repulsion of similarly charged groups which is propagated down the length of the polymer causing the charges to build up. Relaxing the stress draws the charges back into the polymer. Therefore, the stressing of the tire acts to apply and release stress on the piezoelectric polymer sensor.

Figure 1:
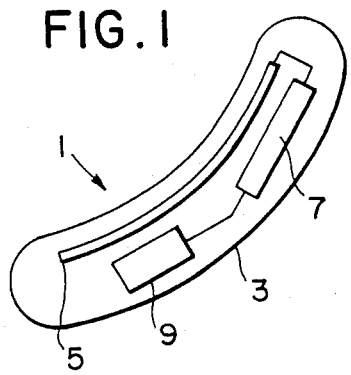
FIG. 1 is a schematic view of the apparatus of this invention.

FIG. 1 of the drawings illustrates an apparatus 1 in accordance with this invention.

The apparatus 1 comprises an elastomeric component 3, which flexes with the tire. The elastomeric component permits a piezoelectric polymer sensor 5 to detect the flexing of the tire as well as to adhere the apparatus 1 to the tire.

When the sensor detects a change in stress it sends an electrical charge to a counter circuit 7.

Figure 2:
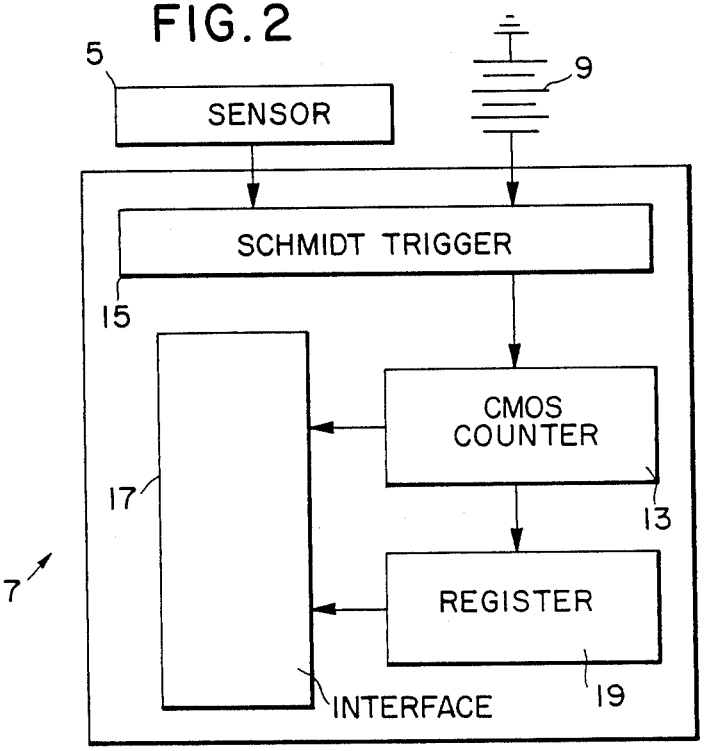
FIG. 2 is a schematic diagram of the counter circuit.

As illustrated schematically in FIG. 2, the counter circuit 7 preferentially comprises a counter 13 with input signal conditioning 15 and a serial data interface 17. The input signal conditioning is performed by a Schmidt trigger or other suitable circuit which is effective in shaping and amplifying the electrical pulse from the piezoelectric polymer so that it is suitable as an input to the counter.

The preferred embodiment of the counter circuit 7 is capable of counting up to 100 million revolutions and can also include a storage register 19 to allow tire identification by a code which is electronically input upon the installation of the apparatus. The counter circuit is preferentially powered by a battery 9.

Figure 3:
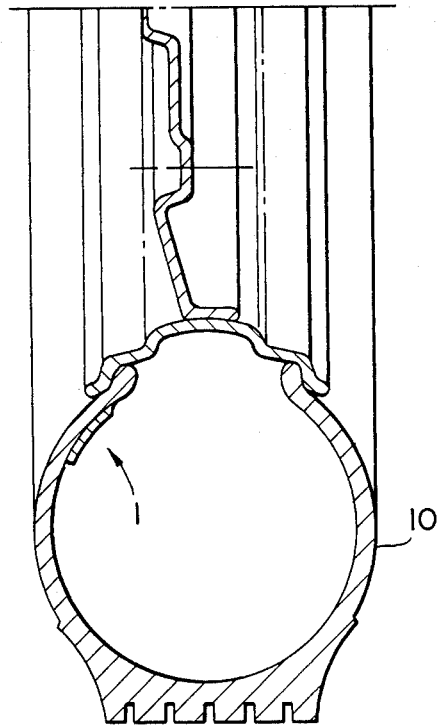
FIG. 3 is a cross section view of a tire showing the apparatus of this invention as it is mounted in the tire.

FIG. 3 illustrates the apparatus 1 mounted to the inner sidewall of a tire 10. The apparatus adheres to the inner sidewall in the same manner as a conventional tire puncture repair patch.

The counter internally keeps track of the number of pulses from the piezoelectric device. In order to visually perceive the information, a variety of well-known techniques can be utilized. For example, a counter is utilized in prior art Betts, U.S. Pat. No. 4,210,898, which is incorporated by reference. An electronic readout may be installed with the apparatus but, since it is preferred to utilize the apparatus to count the nunmber of pulses until tire failure, it is, therefore, preferred to electronically download the information of the counter at such time as failure has occurred.

For this reason, the counter is not removed until the tire has been worn out. It is preferred to locate the counter in such a way that it will not be destroyed if there is a flat tire. For example, as illustrated in FIG. 3 of the drawings, the counter 1 is located near the bead area. The bead in accordance with the federal regulations must maintain its integrity in the event of a tire failure.

It is thus seen that the apparatus of this invention provides an improved method for determination of automobile tire revolutions. As various other advantages and features will be apparent to those of skill in the art from a reading of the foregoing description which is exemplary in nature, such variations are included within the spirit and scope of the invention as defined by the following appended claims.

That which is claimed is:

1. An apparatus for mounting upon a flexible tire to count tire revolutions comprising:
   a piezoelectric sensor with means for securely mounting on the flexing portion on the inside wall of said tire;
   a counter circuit which receives input from said sensor when said sensor is stressed by the flexing of said tire to count the number of deflections thereof; and
   a battery which powers said counter circuit;
   whereby revolutions are counted and stored in an automotive and truck tire.

2. The apparatus in accordance with claim 1 further including an encapsulation elastomeric compound which adheres said apparatus to the tire.

3. The apparatus in accordance with claim 1 wherein the sensor is a piezoelectric polymer which senses stress in the tire as said tire makes a revolution.

4. The apparatus in accordance with claim 1 wherein the counter circuit comprises a low power counter with input signal conditioning and a serial data interface.

5. The apparatus in accordance with claim 4 wherein said input signal conditioning is performed by a Schmidt trigger or other circuit suitable for pulse conditioning which is effective in eliminating contributions from background noise.

6. The apparatus in accordance with claim 1 is powered by a battery.

* * * * *